(12) United States Patent
Weilkes et al.

(10) Patent No.: US 6,856,874 B2
(45) Date of Patent: Feb. 15, 2005

(54) MULTI-PURPOSE DRIVER ASSIST SYSTEM FOR A MOTOR VEHICLE

(75) Inventors: Michael Weilkes, Sachsenheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/311,500
(22) PCT Filed: Apr. 9, 2002
(86) PCT No.: PCT/DE02/01287
§ 371 (c)(1), (2), (4) Date: Mar. 26, 2003
(87) PCT Pub. No.: WO02/084329
PCT Pub. Date: Oct. 24, 2002

(65) Prior Publication Data
US 2003/0167113 A1 Sep. 4, 2003

(30) Foreign Application Priority Data
Apr. 18, 2001 (DE) .......................... 101 18 903

(51) Int. Cl.⁷ .............................. G06F 7/00
(52) U.S. Cl. .................... 701/45; 701/96; 701/301; 280/735; 340/903
(58) Field of Search .................... 701/45, 96, 300, 701/301; 340/435, 436, 438, 903; 280/734, 735

(56) References Cited

U.S. PATENT DOCUMENTS

| | | |
|---|---|---|
| 5,732,785 A | 3/1998 | Huang et al. ............... 180/271 |
| 5,835,007 A | 11/1998 | Kosiak ......................... 340/436 |
| 5,949,366 A * | 9/1999 | Herrmann ..................... 342/72 |
| 2002/0105423 A1 * | 8/2002 | Rast ............................ 340/479 |

FOREIGN PATENT DOCUMENTS

| | | |
|---|---|---|
| EP | 0 728 624 | 8/1996 |
| WO | 98 15436 | 4/1998 |
| WO | 00 73818 | 12/2000 |

OTHER PUBLICATIONS

Weller J: "Vorausschauende Sensorik fuer zukuenflige Sicherheitssysteme", Innovattver KFZ–Insassen–Und Partnerschutz. Tagung Berlin, Sep. 30–Oct. 1, 1999, VDI Berichte 1471, Duesseldorf: VDI Verlag GmbH, Germany, vol. 471, page(s) 229–236 XP002203527 ISBN: 3-18-091471-8*.

* cited by examiner

Primary Examiner—Gertrude A. Jeanglaude
(74) Attorney, Agent, or Firm—Kenyon & Kenyon

(57) ABSTRACT

A driver assistance system for a motor vehicle has at least one sensor for measuring the distance of the vehicle from an object and a control unit for activating functional groups of the motor vehicle as a function of the measuring result of the sensor. The control unit may be switched between a park-distance control operating mode and a pre-crash operating mode as a function of the speed of the vehicle. A switchover between a cruise-control operating mode and the pre-crash operating mode is dependent on a movement of an object relative to the vehicle as ascertained by the sensor.

9 Claims, 3 Drawing Sheets

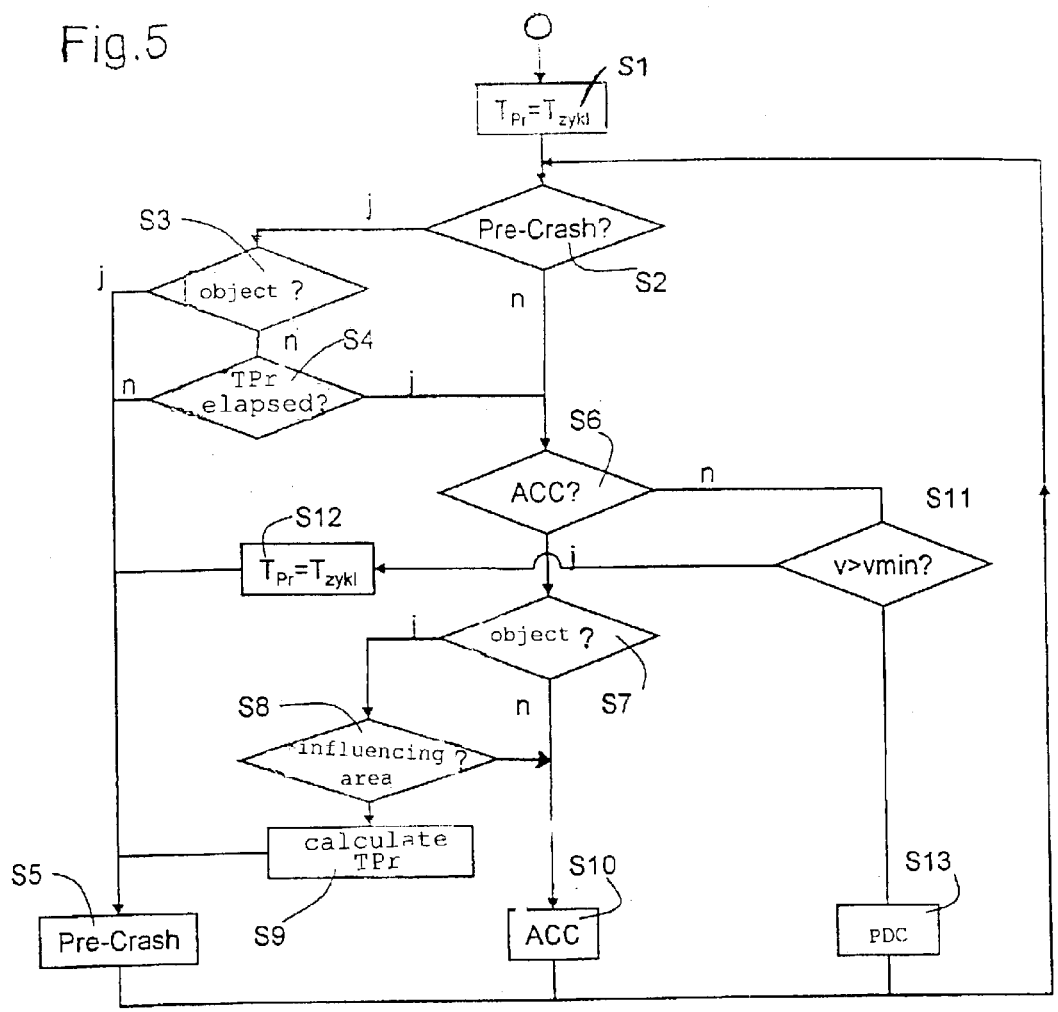

MULTI-PURPOSE DRIVER ASSIST SYSTEM FOR A MOTOR VEHICLE

FIELD OF THE INVENTION

The present invention relates to a driver-assistance system for a motor vehicle having at least one sensor for measuring the distance of the vehicle from an object, and having a control unit for activating functional groups of the motor vehicle as a function of the measuring result of the sensor, the driver-assistance system being suitable for a plurality of applications.

BACKGROUND INFORMATION

Driver-assistance systems for motor vehicles have, for instance, three basic application fields.

The first of these is the so-called pre-crash control which is meant to detect the imminent occurrence of a collision of the vehicle with an object and to activate, or precondition, occupant safety systems of the vehicle just prior to the actual occurrence of the collision, in this way protecting the occupants from the results of the accident to the greatest possible extent.

A second application field is the so-called park distance control. Park distance controls are provided for detecting objects in the immediate vicinity of the vehicle with which it may collide, given low vehicle speed and situations that are difficult to assess, and to bring these to the driver's attention.

A third application relates to cruise-control systems, also known as adaptive cruise control (ACC), which detect the distance to adjacent vehicles when driving in a queue and adapt the speed of the vehicle to that of an adjacent one, so that driver stress may be reduced in heavy traffic.

Although these three applications have in common that their implementation in each case requires at least one sensor for measuring the distance of the vehicle from an object and a control unit for activating functional groups of the vehicle as a function of the measuring result of the sensor, it is difficult, nevertheless, to integrate a plurality of these applications into a unified system in such a way that the driver actually has the unrestricted use of these various systems.

The reason for this is that the demands of the three applications on the measuring results of the sensor, which the control unit requires, and the spatial expansion of the area to be monitored vary widely. For instance, in the park-distance control operating mode, distance information for a distance range of generally less than 1.5 m is required, relatively long time periods of several 10 milliseconds being available for the detection. On the other hand, the distance resolution of these measuring results must be in the range of 10 cm or less. The spatial area to be monitored not only includes the area in the front and the rear of the vehicle in extension of the vehicle center axis, but also those areas lying considerably beyond this axis, since it is normal to drive tight curves when parking and it is possible, therefore, for a vehicle to collide with objects that are next to it, in front or behind it, away from its instantaneous driving direction. In an ACC system, the distance range that is of interest is usually between a few meters to a few 10 m in front of the vehicle. In a pre-crash system, it is generally desirable to monitor any direction from which a potentially dangerous object may approach. The distance range that is of interest is very wide since a potentially dangerous object, depending on its own velocity and that of the vehicle, should be detected and monitored already within a distance of up to several 10 meters, it possible. Small distances also require precise measurements, in order to accurately predict the actual collision time and to be able to ensure that the safety systems are not activated unintentionally when the vehicle merely passes in close proximity to an object that was detected as dangerous and which is monitored by the pre-crash system, without colliding with it.

Due to these different demands, driver-assistance systems are generally designed for no more than one of the mentioned application areas. While it would be conceivable to create a driver-assistance system that lets a driver switch between a plurality of operating states corresponding to the mentioned applications, this would entail the considerable disadvantage, however, of only one of the three safety systems being available at any given time. This means that no pre-crash protection would be available if such a driver-assistance system were used for an ACC-control, and vice versa. An especially dangerous moment in such a system would also result if the driver, depending on the driving situation, neglected to select the appropriate operating mode, thus considering himself safe, when this is actually not the case.

SUMMARY

The present invention provides a driver-assistance system for a motor vehicle which allows, the aforementioned difficulties notwithstanding, use of a distance sensor for a plurality of the enumerated applications, without this diminishing the safety of the individual applications. A driver-assistance system according to the present invention allows, on the one hand, the control unit to be able to be switched between a park-distance control operating mode and a pre-crash operating mode as a function of the vehicle speed. At low speed, which is typical for a parking situation, but at which the risk of injury for the occupants is relatively low in the event of a collision, this driver-assistance system is operated in the park-distance control operating mode, whereas, at higher speeds, it is operated in the pre-crash operating mode.

A warning device alerting the driver to an imminent collision with an obstacle may be one of the functional groups activated in the park distance-control operating mode, or a brake that is automatically actuated by the driver-assistance system, so as to bring the vehicle to a stop just prior to it colliding with the obstacle.

Among the preferred functional groups activated in the pre-crash operating mode are occupant-safety systems such as a belt tightener, an air bag and, in the case of open vehicles, a roll bar.

Also useful is an ability of the control unit, dependent on a detected movement of an object relative to the vehicle, to switch from the park-distance control operating mode to the pre-crash operating mode. If, for instance, an object detected in the vehicle vicinity in the park-distance control operating mode is moving very rapidly, the occupant-safety systems may still be activated prior to a collision.

The aforementioned advantages are also obtained by the fact that the control unit is able to be switched between a cruise-control operating mode and a pre-crash operating mode, as a function of a movement of an object relative to the vehicle that has been measured by the sensor. In this manner, the safety functions of the pre-crash operating mode are also made available when the vehicle is in an operating state that is subject to cruise-control.

Expediently, the switchover into the pre-crash operating mode is temporary, so that, when a dangerous situation leading to the switchover into the pre-crash operating mode has passed, the system returns to the cruise-control operating mode as quickly as possible.

The minimum time period over which the pre-crash operating mode is maintained in the event of such a switchover, is appropriately specified by the control unit, based on the vehicle speed and the measured distance to the object. After this time period has elapsed, the control unit checks whether the conditions for the switchover into the pre-crash operating mode continue to exist or not and, if appropriate, returns to the cruise-control operating mode.

In normal operation of the driver-assistance system, the control unit may make a cyclical decision as to whether a switchover between the operating modes is necessary. When a potentially dangerous object is detected in the pre-crash operating mode and is "under observation", these cyclical decisions may be suspended in order to save processing time.

BRIEF DESCRIPTION OF THE DRAWINGS

FIGS. 3 to 5 are flow charts of working processes of the control unit.

DETAILED DESCRIPTION

Figure 1:
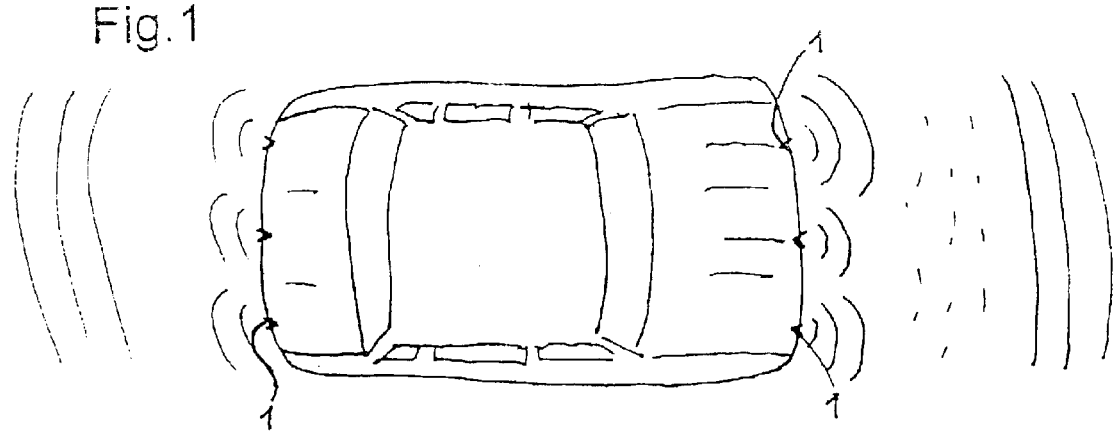
FIG. 1 is a schematic plan view of a vehicle having a plurality of distance sensors.

FIG. 1 is a plan view of a motor vehicle provided with a plurality of distance sensors 1, in 24 GHz radar technology, for instance, which are installed in a plurality of locations at the front and the rear of the vehicle.

Figure 2:
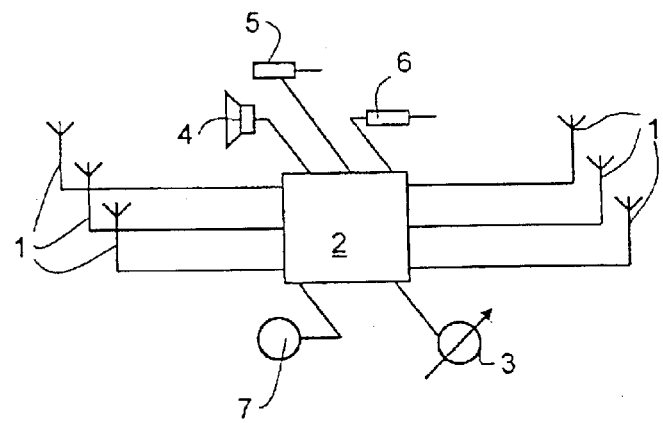
FIG. 2 is a block diagram of the driver-assistance system.

Sensors 1 each transmit, for example, radio impulses and record their echos as reflected by objects in the vehicle vicinity. The echo times of the various contributions of the received echoes enable a control unit 2 (cf. FIG. 2) connected to sensors 1 to calculate the distance of the vehicle to various objects in its environment. Moreover, at least one sensor 3 for the vehicle speed, an acoustic or optical warning device 4 mounted in the passenger cabin of the vehicle, as well as actuators 5, 6 for acting on the brake or the engine output of the vehicle, are connected to control unit 2. Finally, safety devices, schematically indicated by reference numeral 7, such as belt tighteners, air bag-igniters or, if the respective vehicle is a convertible, a pop-up mechanism for a roll bar, are connected to control unit 2.

Control unit 2 provides at least two different operating modes, which are selected from among a pre-crash operating mode, a park-distance operating mode and a cruise-control operating mode.

In the park-distance control (PDC) operating mode, control unit 2 operates each sensor 1 independently of one another. A radar impulse, emitted by a sensor 1 toward the area in front or in the rear of the vehicle in an essentially undirected manner, hits objects, if these are present, which reflect echoes that are picked up by sensors 1. Upon detection of sensor 1, which transmitted the impulse, and the echo times of the various echo components toward the different sensors 1, control unit 2 is able to estimate both the distance of an object from the vehicle as well as the angle that the object occupies relative to a reference direction of the vehicle, for example, its driving direction. If the measured distance is below a first critical limit in a direction in which the vehicle is traveling, a warning signal is issued to the driver via a warning device 4. If the distance is below a second critical limit, control device 2 activates actuator 5 in order to brake the vehicle and to prevent a collision with the object.

In the cruise-control, or ACC, operating mode, sensors 1 at the front section of the vehicle each emit impulses so as to allow control unit 2 to adapt the vehicle speed to that of the preceding vehicle by acting on actuators 5 or 6, without this leading to a collision.

In the pre-crash operating mode, sensors 1 may be operated as well. If a potentially dangerous object has been detected, it may be necessary to switch to an individual operation of sensors 1, resembling that of the park-distance control operating mode, so that two-dimensional location information may be obtained for the object, and its movement be monitored relative to the vehicle and its danger estimated. This type of control of the sensors excludes a simultaneous utilization of the sensor-measuring results for ACC operation. If this monitoring leads to the result that a collision with the object can no longer be prevented, the control unit activates safety devices 7.

Moreover, it may be provided that cyclical, undirected impulses be emitted in the pre-crash operating mode to detect objects approaching the vehicle from directions other than the driving direction.

Due to the different monitoring areas of the various operating modes and their different demands on sensors 1, the various operating modes may not be run simultaneously, but at best interchangeably. The flow charts of FIGS. 3 through 5 show methods that are implemented by control device 2 to specify the respective appropriate operating mode.

Figure 3:
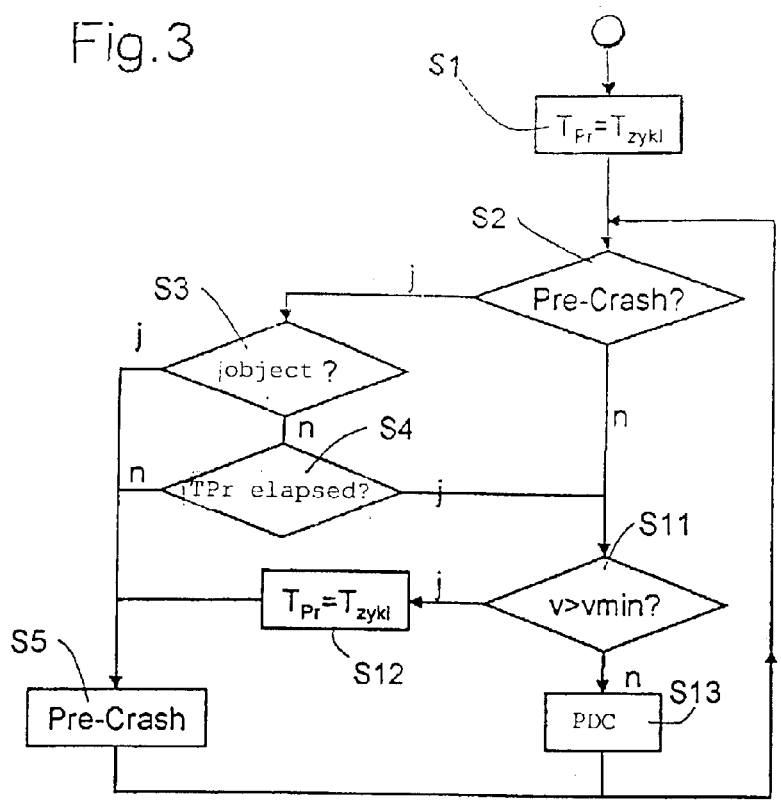
Figure 4:
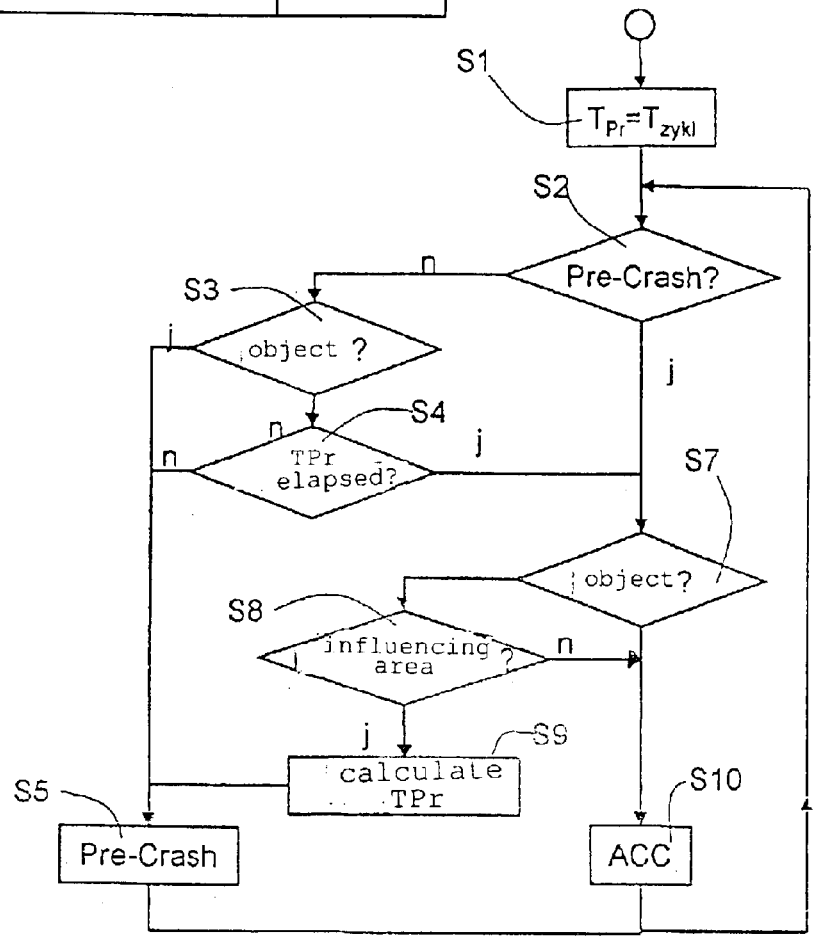

FIG. 3 relates to the case of a driver-assistance system having two operating modes, pre-crash and park-distance control.

In a first step S1 of the method, a duration $T_{Pr}$ of the pre-crash operating mode is stipulated, the importance of which is discussed below. In step S2, it is checked which operating mode of the control device is currently active. In the case of the pre-crash operating mode, it is decided in step S3 whether a previously conducted measurement using sensors 1 has detected a dangerous object in the detection range. If this is the case, the processing immediately branches off to step S5, in which an additional measurement is taken and analyzed in the pre-crash operating mode, and, depending on the result of the analysis, safety devices. 7 may be activated.

If the check in step S3 shows no potentially dangerous object within the detection range, it is checked in step S4 whether duration $T_{pr}$ of the pre-crash operating mode, which was stipulated in step S1, has elapsed. If this is not the case, it is assumed that, even if the dangerous object cannot be detected at the present time, the inherently dangerous situation has not yet passed, and the method branches off to step S5 once again to implement a measurement.

If time span $T_{pr}$ has elapsed, the method branches off from step S4 to S11 in which the instantaneous vehicle speed is compared to a predefined limit speed $v_{min}$. If vehicle speed v exceeds this limit speed, the duration of the pre-crash operating mode is extended by an additional cycle $T_{Pr}=T_{cycl}$ in step S12 and, in step S5, another pre-crash measurement is taken.

If it becomes clear in step S11 that the vehicle speed is below limit speed $v_{min}$, it is assumed that the vehicle is in a parking or maneuvering situation, and the method transitions to step S13 in which a measurement in the park-distance control (PDC) operating mode is conducted.

After each taking of a measurement in step S5 or step S13, the method returns to decision step S2.

In the flow chart of FIG. 4, it is assumed that the driver-assistance system includes the operating modes pre-crash and cruise control (ACC). Steps S1 through S5 of this method are identical to those of FIG. 3 and need not be explained again.

If it is determined in step S2 that the system is not in the pre-crash operating mode, it is ascertained in step S7, in a manner similar to that in step S3, whether a potentially dangerous object is within the monitoring range, based on the preceding measurements. This decision may be made on the basis of the measured distance of an object and also on the basis of its relative velocity relative to the vehicle, which may be determined by a comparison of successive measurements or by Doppler shift of the echo. Due to the fact that the local detecting ranges in which the various operating modes detect objects may vary, a decision follows in those cases where a potentially dangerous has been detected in step S8 as to whether the object is located within the range that is safety-relevant for the pre-crash operating mode. If this is the case, the control unit, in step S9, calculates a time span $T_{pr,}$ on the basis of the measured distance of the object and the relative velocities of the vehicle and the object or the vehicle speed, during which the pre-crash mode should be maintained as a minimum in order to monitor the object until it is expected to have left the safety-relevant area for the pre-crash operating mode. After stipulating this time span, a pre-crash measurement is taken in step S5, and such measurements are cyclically repeated at least until it is determined in step S4 that the stipulated time span $T_{Pr}$ has elapsed.

If no safety-relevant object is found in step S7, the method branches to step S10 in which a measurement in the cruise-control operating mode ACC is implemented.

As shown in FIG. 5, in the case of a driver-assistance system controlling all three operating modes, it is possible to combine steps S1 through S13, which were described before with reference to FIGS. 3 and 4, to form a unified method, adding a step S6 in which a branching to step S7 or S11 occurs, depending on whether or riot the driver of the vehicle has selected the cruise-control operating mode. This ensures that the most suitable of the three operating modes is automatically selected, in each case adapted to the current driving situation of a vehicle with respect to speed and danger through external objects.

As a result of the sequence of decision steps S2, S6, S11, it is achieved in this case that in a dangerous situation, i.e. when control device 2 has previously selected the pre-crash operating mode for time span $_{Tpr}$, the system works solely in the pre-crash operating mode, without control device 2 losing any processing time for steps S6, S11, whereas, if the system is in one of the two other operating modes, a new decision is made in each working cycle of the method as to the respective operating mode to be used.

Although the present invention is described on the basis of the aforementioned preferred exemplary embodiments, the method is not limited thereto, but may be modified in numerous of ways.

For instance, if PDC, ACC and Pre-crash are combined, steps S7 through S9 may also be implemented following S11.

What is claimed is:

1. A driver assistance system for a motor vehicle, comprising:
   at least one sensor configured to measure at least one of a distance and a speed differential of the motor vehicle from an object; and
   at least one control unit configured to activate at least one functional unit of the motor vehicle as a function of a measuring result of the sensor, wherein the control unit is configured to be switched between a park-distance control operating mode and a pre-crash operating mode as a function of a speed of the vehicle.

2. The driver assistance system according to claim 1, wherein the at least one functional unit activated in the park-distance control operating mode includes at least one of a warning device for generating a warning signal and a brake.

3. The driver assistance system according to claim 1, wherein the at least one functional unit activated in the pre-crash operating mode includes at least one of a belt tightener, an air bag, and a roll bar.

4. The driver assistance system according to claim 1, wherein the control unit is configured to be able to change from the park-distance control operating mode to the pre-crash operating mode as a function of one of a detected movement and a position of the object relative to the motor vehicle.

5. A driver assistance system for a motor vehicle, comprising:
   at least one sensor configured to measure at least one of a distance and a speed differential of the motor vehicle from an object; and
   a control unit configured to activate at least one functional unit of the motor vehicle as a function of a measuring result of the sensor wherein the control unit is configured to be switched between a cruise-control operating mode and a pre-crash operating mode as a function of at least one of a movement measured by the sensor and a position of the object relative to the motor vehicle.

6. The driver assistance system according to claim 5, wherein a switch into the pre-crash operating mode is temporary.

7. The driver assistance system according to claim 6, wherein the control unit is configured to stipulate a time span, wherein the pre-crash operating mode is minimally maintained during said time span, on a basis of a motor vehicle speed and a measured distance between the motor vehicle and the object.

8. The driver assistance system according to claim 5, wherein the control unit is configured to cyclically make decisions regarding the switch between the operating modes.

9. The driver assistance system according to claim 8, wherein the control unit is configured to suspend the cyclical decisions if a potentially dangerous object is detected in the pre-crash operating mode.

* * * * *